(12) United States Patent
Roller et al.

(10) Patent No.: US 6,612,728 B2
(45) Date of Patent: Sep. 2, 2003

(54) MARKER LAMP WITH PICTURE FRAME OPTICS

(75) Inventors: Philip C. Roller, Ashville, NY (US); Jon A. Stineman, Lakewood, NY (US)

(73) Assignee: Truck-Lite Co., Inc., Falconer, NY (US)

( * ) Notice: Subject to any disclaimer, the term of this patent is extended or adjusted under 35 U.S.C. 154(b) by 0 days.

(21) Appl. No.: 09/900,212

(22) Filed: Jul. 6, 2001

(65) Prior Publication Data

US 2002/0003708 A1 Jan. 10, 2002

Related U.S. Application Data

(60) Provisional application No. 60/216,850, filed on Jul. 7, 2000.

(51) Int. Cl.[7] ................................................ F21V 5/00
(52) U.S. Cl. ..................... 362/521; 362/327; 362/339; 362/545
(58) Field of Search ........................ 362/520, 521, 362/333, 543, 544, 545, 332, 522, 339; D26/28

(56) References Cited

U.S. PATENT DOCUMENTS

| | | | | |
|---|---|---|---|---|
| 1,530,621 A | | 3/1925 | Ritter | 362/309 |
| 2,254,961 A | | 9/1941 | Harris | 362/327 |
| 3,633,022 A | | 1/1972 | Knut | 240/8.3 |
| 3,831,018 A | * | 8/1974 | Weber | 362/485 |
| 4,630,184 A | * | 12/1986 | Ferrero | 362/293 |
| 4,855,877 A | * | 8/1989 | Otaka | 362/242 |
| 5,335,151 A | | 8/1994 | Dahlberg | 362/327 |
| 5,388,035 A | | 2/1995 | Bodem, Jr. | 362/545 |
| 5,580,156 A | | 12/1996 | Suzuki et al. | 362/184 |
| 5,632,551 A | * | 5/1997 | Roney et al. | 264/272.13 |

* cited by examiner

Primary Examiner—Sandra O'Shea
Assistant Examiner—Ali Alavi
(74) Attorney, Agent, or Firm—The Bilicki Law Firm, P.C.

(57) ABSTRACT

A marker lamp distributes light without the use of mirrors or reflectors. The marker lamp uses a combination of corner cube optics and intersecting cylindrical prisms on the lens, distributing light in accordance to the United States and the United Nations standards for the European community for marker lamps. The marker lamp uses as a light source a reduce number of light emitting diodes, a maximum of three. The marker lamp is design to be slim and sturdy.

31 Claims, 3 Drawing Sheets

MARKER LAMP WITH PICTURE FRAME OPTICS

PRIORITY CLAIM

This application claims priority to U.S. Provisional Patent Application, Ser. No. 60/216,850, filed Jul. 7, 2000.

FIELD OF INVENTION

The present invention is related to a marker lamp for vehicles, more particularly, a marker lamp that does not require the use of mirrors or reflectors to distribute light.

BACKGROUND OF THE INVENTION

Marker lights are an important factor in the safe operation of vehicles, especially trucks. Marker lights must be easily recognized and must be well defined in terms of A color, light intensity and light distribution. A marker lamp will be used along side of a vehicle to indicate the overall shape, length and width of a vehicle. To accomplish this, the marker lamp must distribute light over a wide range.

Marker lamps have been made by high power consuming incandescent bulbs, light emitting diodes and the use of reflective surfaces (mirrors) to get a wide range of light diffusion. Another design of marker apparatus exists, a reflector, whose construction allows the lamp to reflect the light beam emitted from an automobile. These types of markers are usually used on the side of the road so that a driver can recognized the road boundary. The design of this type of marker is limited since the efficiency of recognition depends on the intensity of the light beam produced by oncoming vehicles. A vehicle without headlamps, for example, will not produce light that may be reflected. Combination marker/clearance lamps that are made by using light-emitting diodes exist. The advantage of using light-emitting diodes in lamps is that a light emitting diode has a relatively long service life and low power requirements. Most of the other designs require a large number of light-emitting diodes and complicated optics to allow the correct light intensity and distribution. Large numbers of light-emitting diodes produce additional heat, which must be removed from the lamp, since heat will affect the performance of the light emitting diodes. Thus, heat dissipation elements must be added and these elements complicate the design of the lamps. To obtain the proper light distribution, the other designs require the use of reflective surfaces (usually mirrors), or segmented circuit boards to which are mounted light-emitting diodes to provide for different light distribution, or aimed light-emitting diodes. Reflective surfaces or mirrors add additional cost to the design and at least one extra part to the lamp design. Segmented boards, on the other hand, require special mounting considerations and generally can not be potted for protection. This makes the construction of the lamp using segment circuit boards more complicated and potentially more fragile.

In addition to the above limitations, other designs of marker lamps do not meet both the United States (and the Society of Automotive Engineers) and European standards for marker lamps. Also, other designs of marker lamps do not allow both horizontal and vertical mounting while continuing to meet the U.S. and European standards. The United States standards are usually less stringent than the Society of Automotive Engineers ("SAE") standards. Thus, the SAE standards require that marker lamps produce a light intensity of 0.25 cd for a red colored lamp and 0.62 cd for an amber colored lamp over a range of 45 degrees in each direction from a reference axis. The United Nations (U.N.) standards for the European Community require that marker lamps produce a minimum light intensity of 4.0 cd (in the axis of reference) and 0.6 cd within the specific angular field. The U.N. standards require that marker lamps have a maximum light intensity of 25.0 cd. The U.N. standards require a vertical light distribution over at least 10 degrees in each direction from a reference axis in the center of the lamp. The U.N. standards require a horizontal distribution over at least 30 degrees in each direction from a reference axis in the center of the lamp.

U.S. Pat. No. 5,388,035 shows a circular marker lamp using only three light-emitting diodes. Each of the light-emitting diodes is aimed at a specific angle so that the conical light output beam is centered on.an axis that is normal to the plane of the lens wall. The rear surface of the lens front wall contains three different sets of light spreading prism ribs, which need to be optically aligned with each light-emitting diode.

U.S. Pat. No. 1,530,621 teaches the use of a conical reflector as part of an optical system to direct light towards a single spot as used in a light projector.

U.S. Pat. No. 2,254,961 discloses the use of a unitary lens, light and reflector system in which an outwardly curved portion (bubble shape) is present in the center of the lens.

U.S. Pat. No. 3,633,022 is generally directed to a lamp having a lens, a light source, and a reflector. The lens has an outer surface that acts as a dispersing lens. This dispersing element is form by a double concave cylindrical lens with a double grooved shape. The design is directed to an incandescent lamp, which uses reflectors to accomplish the desired spread and intensity of light.

Finally, U.S. Pat. No. 5,580,156 illustrates a marker apparatus for traffic capable of improving the recognition efficiency by using the enhancing effect of a light source beam and a reflected light beam. The marker apparatus is used at road boundaries to help drivers recognize the boundaries of the road. The marker apparatus accomplishes this by the use of a retroreflector which is composed of three reflective surfaces arranged on three surfaces of a trigonal pyramid and a light source disposed on an optical axis of the retroreflector. A disadvantage of this design it is slightly bulky with more than three light-emitting diodes required.

SUMMARY OF THE INVENTION

The present invention solves the above mentioned limitations of the previous designs in a cost-effective manner by using a reduced number of light-emitting diodes and an optics design. The invention utilizes a housing, a lens, power cables, a circuit board, light emitting diodes and an optics design incorporated into- the lens. The invention also uses seals, resistors, and cables such that power is supplied to the marker lamp and the lamp can be assimilated into the overall vehicle power system. The optics design does not require a mirror to produce the light intensity and angular distribution required by the United States and by the United Nations standards for the European Community for marker lamps. The resultant lamp will be a marker lamp that is sturdy, slim, and reasonably priced. The resultant lamp can also be mounted either horizontally or vertically as respects the long axis of the lamp, while still meeting the aforementioned standards.

The present invention uses a combination of corner cube optics and intersecting cylindrical prisms or picture frame optics in the lens of the lamp. This corner cube optics is also known as retrodirective reflectors or reflex reflectors. The reflex reflectors at each side of the lens of the marker lamp efficiently reflects light from outside sources such as an incoming car, or a roadside traffic lamp, or the sun. The center portion of the lens of the marker lamp is formed by a series of cylindrical prisms intersecting each other, in such a way to resemble the appearance of a picture frame. The center portion could also be modified from the present description with a simple convex lens. The function of the center portion of the lens is to concentrate the light from the light emitting diodes and distribute the light over the desired parameters.

These above mentioned characteristics and other objects of the invention will become more apparent from the following description of the preferred embodiments.

OBJECTS OF THE INVENTION

Accordingly, it is an object of the present invention to provide a marker lamp that utilizes a reduced number of light emitting diodes.

It is also an object of the present invention to provide a unique optical system, including reflective surfaces at the sides and cylindrical prisms in the center.

It is a further object of the present invention to provide a unique optical system that distributes light over a wide range of angles.

In addition, it is an object of the present invention to provide a marker lamp comporting with the requirements of both the United States and United Nations standards for the European Community for marker lamps.

Additionally, it is an object of the present invention to provide a marker lamp that can be mounted either horizontally or vertically along the long axis of the lamp while continuing to meet both the U.S. and U.N. standards.

BRIEF DESCRIPTION OF THE DRAWINGS

Other aspects, objects, and advantages of the present invention appear more clearly on reading the following best mode for carrying out the invention, given by way of example and made with reference to the accompanying drawings, in which.

BEST MODE FOR CARRYING OUT THE INVENTION

Figure 1:
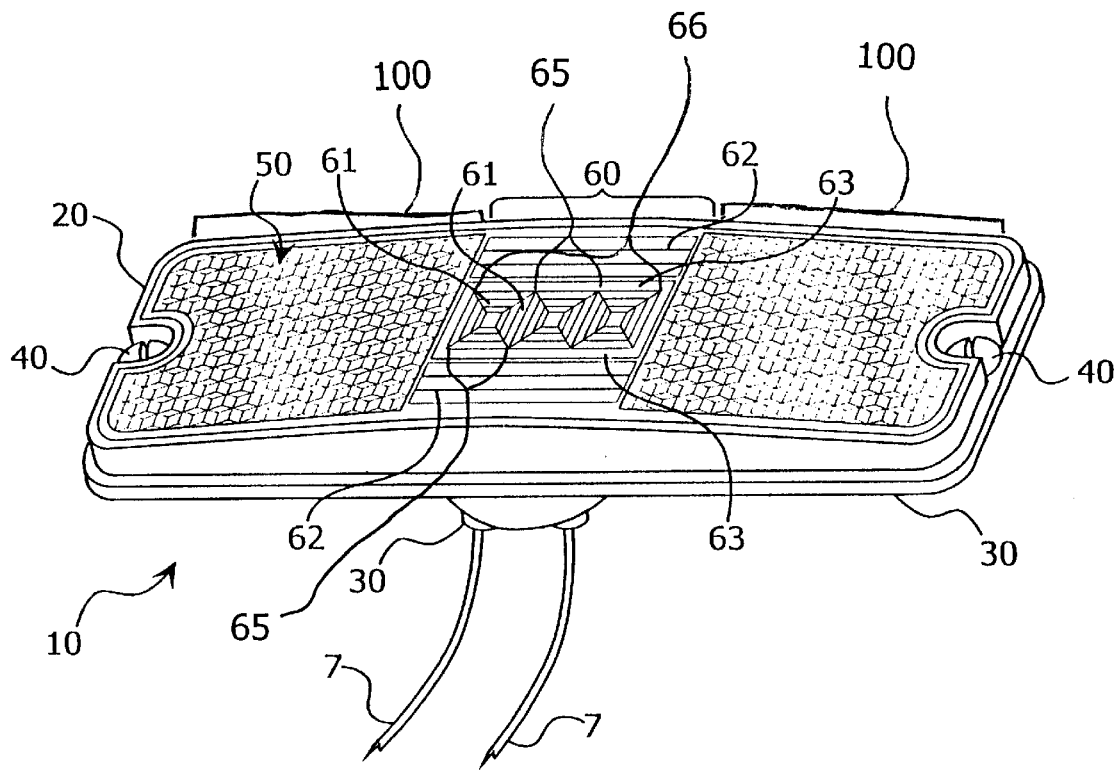
FIG. 1 is a three-dimensional front view image of the marker lamp described in the invention.

For the purpose of promoting an understanding of the present invention, reference will be made to a red color lamp as illustrated in the drawings. It will nevertheless be understood that no limitations of the scope of the invention is thereby intended, such alterations as using an amber lamp or advances in light-emitting diode technology could provide additional alterations which would fall within the spirit and scope of the invention described herein. Some of the possible alterations will be mentioned in the following description. One possible modification is the use of simple convex lens instead of intersecting cylindrical surfaces. The lamp is also illustrated in the horizontal, as respects the long axis of the lamp, mounting position. One skilled in the art should understand that the lamp could also be mounted in a vertical, as respects to the long axis of the lamp, position.

The drawings will be described in detail. For the ease of the reader, like reference numerals designating identical or similar part will remain consistent through the drawings.

FIG. 1 shows a three dimensional front view of the marker lamp 10 featured in the invention. The lamp 10 possesses a lens 20 and the housing 30. The lens 20 is composed of two sets of reflex reflectors 50 at opposite sides of lens 20. The reflex reflectors 50 reflect outside light, such as sun light or light from the headlamp of an incoming vehicle. The middle portion of center section 60 of lens 20 is composed of intersecting cylindrical prisms 61, with ribs 62 at the top and bottom of the center portion 60 of the lens 20. Each cylindrical prism 61 will intersect another forming a square, similar to a picture frame. The housing 30 and lens cover 20 can be made of the same material. A preferred material is polycarbonate.

The "picture frame" optics as used in here is defined as a series of intersecting cylindrical prisms, forming or having the appearance of a picture frame. Each picture frame optic will frame smaller picture frame optics. This entire repetitive formation can be repeated to form consecutive picture frames placed side-by-side and surrounded by a rectangle 63 formed by intersecting cylindrical surfaces. In a preferred embodiment three consecutive picture frame are utilized. One skilled in the art will understand that a greater or lesser number of consecutive picture frames can be used. FIG. 1 also shows the holes 40 through which screws can attach the lamp onto the vehicle. It should be understood that one skilled in the art can used other means of attachment to the vehicle, such as a bonding adhesive. Also, FIG. 1 depicts the power cables 70, which will provide power to light the light-emitting diodes and which integrate the marker lamp with the power of the vehicle.

Figure 2:
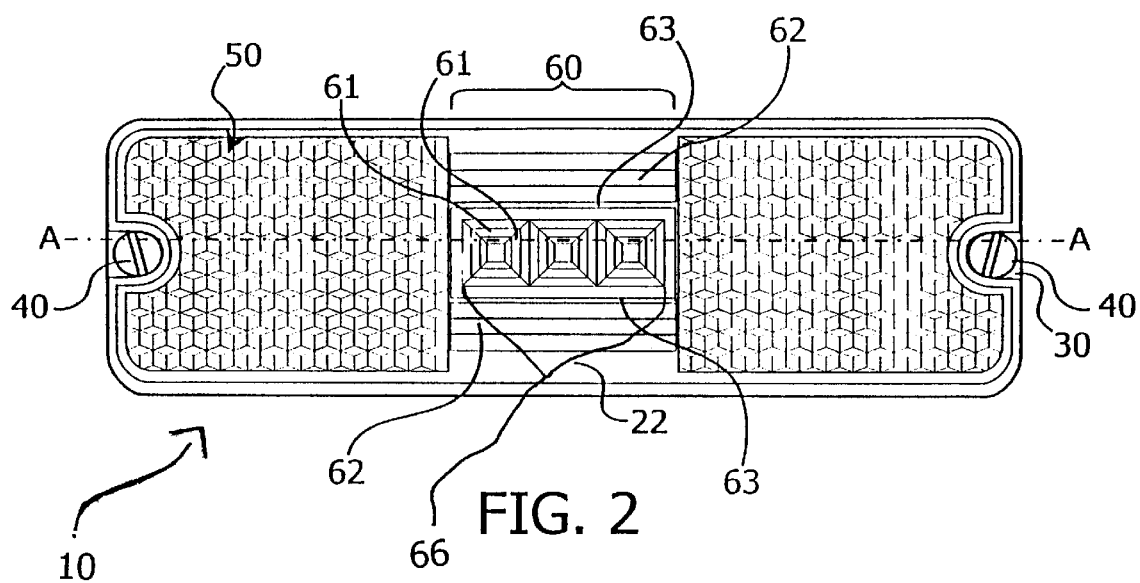
FIG. 2 is a front view of the marker lamp.

FIG. 2 displays a front view of the marker lamp. FIG. 2 depicts, again, the rows of reflex reflectors 50, the cylindrical prisms 61, the ribs 62, rectangle 63 and the attachment holes 40 present in the housing 30. It can be noted that apart from the intersecting cylindrical prisms, there are a set of ribs 62 at the top and bottom of the picture frame optics. In a preferred embodiment, a three-picture frame optics system is used. It should be understood that the number of picture frames or cylindrical prisms are not intended to be limited by this embodiment. An increase or decrease in the number of cylindrical prisms and picture frames are possible modifications to this embodiment.

Figure 3:
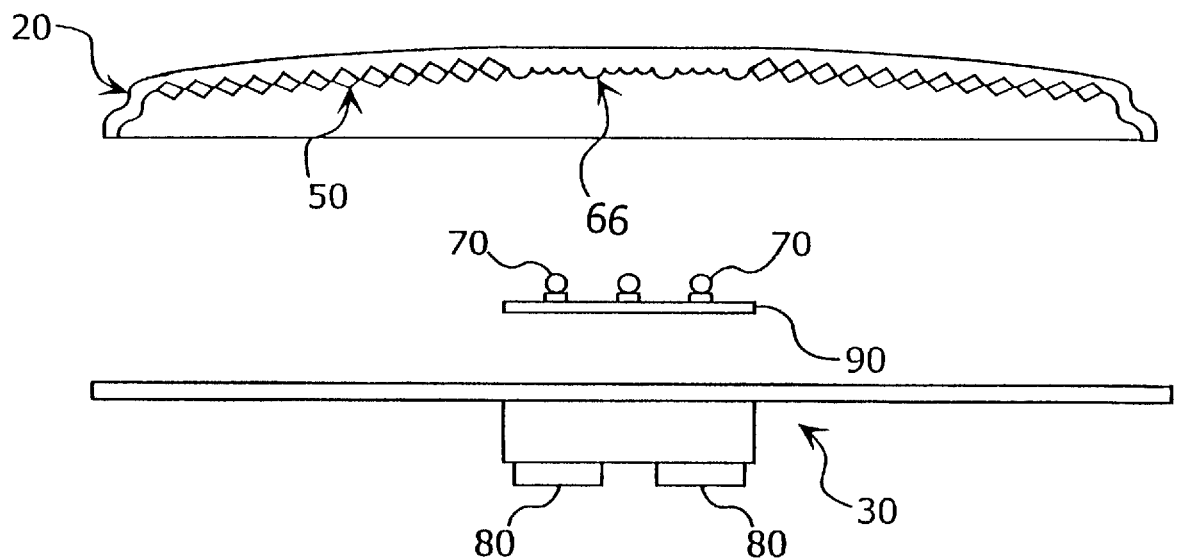
FIG. 3 is an exploded cross section of the marker lamp embodying features of the invention.

FIG. 3 is a cross section in the direction of arrow A from FIG. 2. The one-piece lens 20 is shown with the reflex reflectors 50 and the picture frame optics 60. The three light-emitting diodes 70 are shown inserted on a circular shaped circuit board 90. It should be noted that the circuit board could take any shape, however, for the most preferred embodiment, the circuit board is circular. The circuit board 90 and light emitting diodes 70 are embedded in a potting material for stability and protection from a moisture. The potting material also acts to dissipate heat created by the light emitting X diodes 70. A preferred potting material is epoxy although other materials may be used. The housing 30 is attached to the lens 20 and hermetically sealed, thereby sealing the whole lamp so that water and dust cannot enter the lamp. Cable connectors 80 are attached to the housing 30 such that the joining of the cables 70 to the circuit board 90 is not disturbed by loose wires.

Figure 4A:
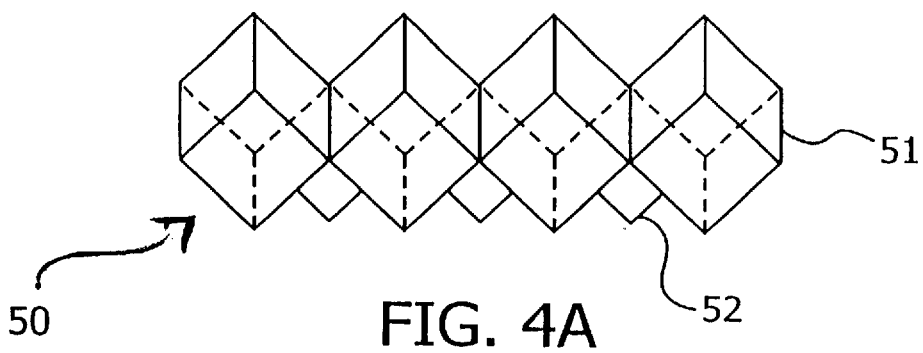
FIGS. 4a and 4b are close up views of the reflex reflectors and the picture frame optics, respectively.
Figure 4B:
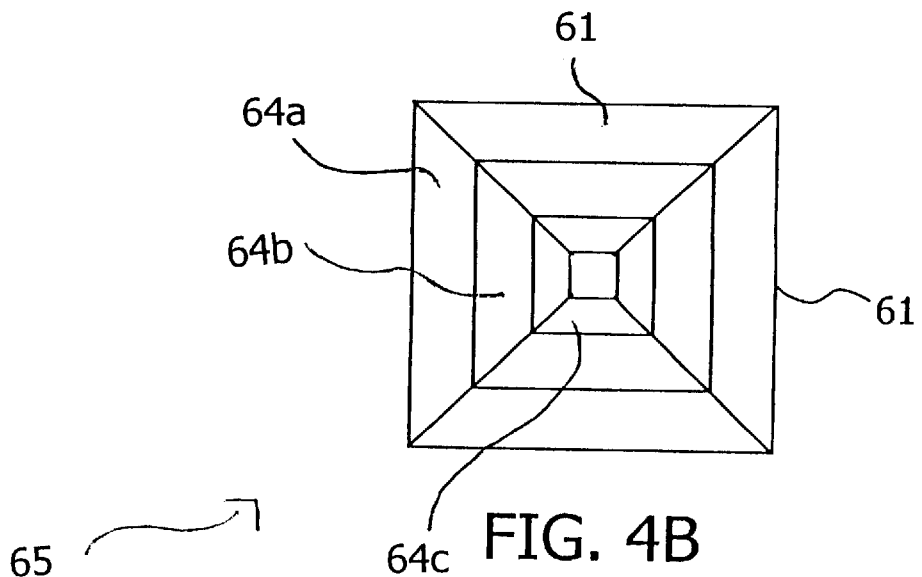

FIGS. 4a and 4b show close ups of the optics present in the lens 20. In FIG. 4a, the reflex reflectors 50 are shown. The first row of three-dimensional cubes 51 is shown. The back row 52 of reflex reflectors is also illustrated. In FIG. 4b, one set of intersecting cylindrical prisms is shown. The site 61 of intersection is shown from one of the corners of the picture frame optic.

Figure 5:
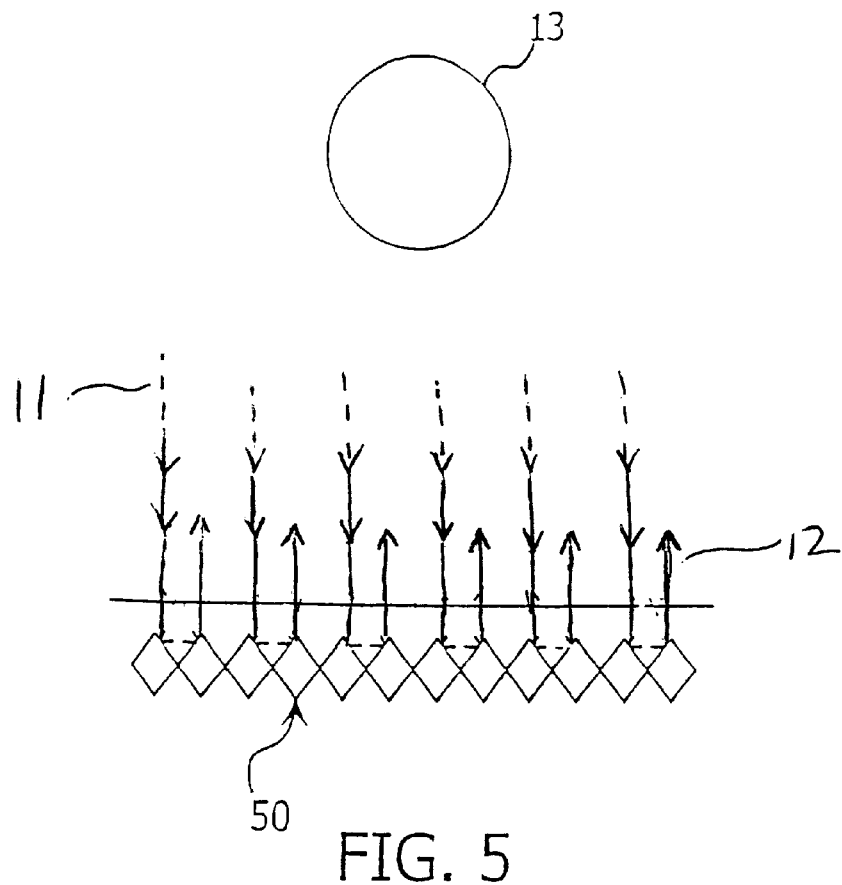
FIG. 5 is a pictorial representation of a beam of light being reflected by the reflex reflectors.

FIG. 5 illustrates how the reflex reflectors 50 will reflect a beam of light from an outside source 13 such as the sun. The beams of light 11 emitted from the outside source 13 will be reflected by the reflex reflectors 50 and fan back to the outside as a spread of light 12. This reflected light distribution is due to the 90-degree angles present in the reflex reflectors 50.

Figure 6:
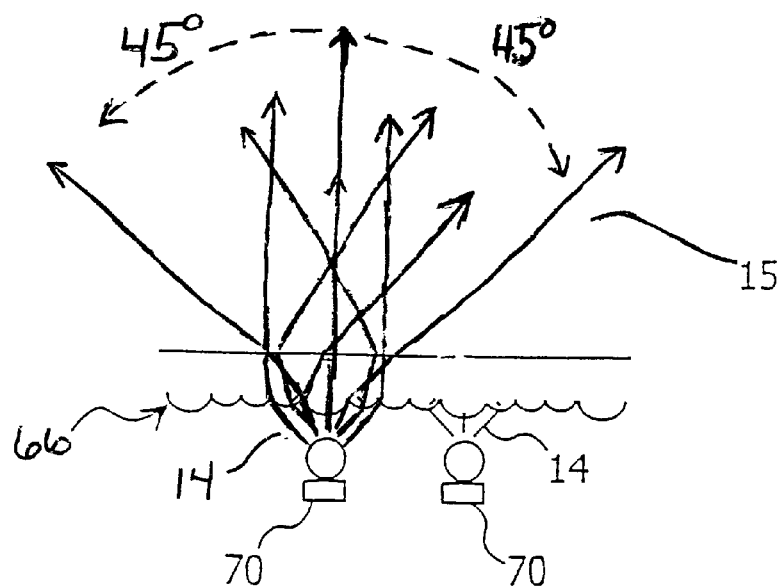
FIG. 6 is a pictorial representation of the beam of light from the light emitting diodes toward the center optics in the marker lamp.

FIG. 6 shows the function of the intersecting cylindrical prisms 60. The cone of light 14 produced by the light emitting diodes 70 will be concentrated or collimated by the picture frame and cylindrical prisms to provide the light intensity and spread 15. The combination of the spread of light 15, shown in FIG. 6, and the spread 12, shown in FIG. 5, will provide for the light intensity and distribution required for meeting legal requisites for the United Nations standards for the European Community and United States.

The description presented in the preferred embodiments of diamond shaped optics, picture frame optics, and cylindrical prisms is not intended to demonstrate all of the possible arrangements and modifications to the design. For those skilled in the art, changes will be apparent that will fall within the scope of the present invention.

What is claimed is:

1. A lamp, comprising:
   a housing;
   a circuit board operatively attached to said housing;
   a lens adapted to be secured to said housing;
   at least one light emitting diode as a first light source operatively attached to said circuit board;
   wherein said lens comprises a plurality of light refracting elements for producing a minimum light intensity of 0.25 candelas in a distribution pattern that is 45 degrees up and down in a vertical direction and 45 degrees left and right in a horizontal direction.

2. The lamp according to claim 1 wherein one of said plurality of light refracting elements is a picture frame array.

3. The lamp according to claim 1 comprising a light reflecting element on said lens for reflecting light form a second light source external to said lamp.

4. The lamp according to claim 3 wherein said light reflecting element comprises reflex reflectors operatively disposed on the inside face of said lens.

5. Lens optics, comprising:
   a light refracting element for distributing light from a light source 45 degrees up and down in a vertical direction and 45 degrees left and right in a horizontal direction from said light source, said light refracting element comprising a plurality of cylindrical prisms operatively arranged to intersect and form at least one nested picture frame arrangement on a lens.

6. A lens, comprising:
   a center section and two side sections adjacent to said center section;
   a first and second light refracting element disposed on the inside face of said lens;
   said first light refracting element comprising at least one nested picture frame arrangement;
   said second light refracting element comprising a plurality of convex rib optics; and
   a light reflecting element disposed on said lens, said light reflecting element comprising a plurality reflex reflectors.

7. The lens according to claim 6 wherein said first and second light refracting elements are located in said center section of said lens.

8. A marker lamp, comprising:
   a housing adapted to mount to a vehicle;
   a circuit board operatively attached to said housing;
   at least one light emitting diode attached to said circuit board;
   a lens operatively attached to said housing;
   a first plurality of cylindrical prisms operatively arranged to intersect and form at least one nested picture frame arrangement in a center section of said lens;
   a second plurality of cylindrical prisms operatively arranged to intersect and form a rectangle that surrounds said at least one nested picture frame arrangement in said center section of said lens;
   a plurality of convex ribs operatively arranged above and below said rectangle in said center section of said lens; and
   a plurality of reflex reflectors operatively arranged in a plurality of rows to the left and right of said center section of said lens.

9. The marker lamp according to claim 8 wherein said at least one light emitting diode and said circuit board are embedded in potting material.

10. The marker lamp according to claim 8 wherein said at least one nested picture frame arrangement is operatively disposed on said lens to receive light from said at least one light emitting diode.

11. The marker lamp according to claim 8 wherein said center section of said lens contains three of said nested picture frame arrangements.

12. The marker lamp according to claim 8 wherein said housing and said lens are made of a substantially identical material.

13. The marker lamp according to claim 12 wherein said material is polycarbonate.

14. The marker lamp according to claim 12 wherein said material is red.

15. The marker lamp according to claim 12 wherein said material is amber.

16. A marker lamp, comprising:
   a housing adapted to mount to a vehicle;
   a circuit board operatively attached to said housing;
   three light emitting diodes operatively attached to said circuit board;
   a lens fixedly attached to said housing;
   a picture frame array disposed in a center section of said lens, said picture frame array comprising three consecutive nested picture frame arrangements, each of said nested picture frame arrangements composed of a first plurality of cylindrical prisms operatively arranged to intersect and form three rectangles decreasing in size;
   a second plurality of intersecting cylindrical prisms operatively arranged to intersect and form a rectangle that surrounds said picture frame array in said center section of said lens;
   a plurality of convex ribs operatively arranged above and below said rectangle in said center section of said lens; and a plurality of reflex reflectors arranged in a plurality of rows to the left and right of said center section of said lens, wherein each of said nested picture frame arrangements is operatively disposed on said lens to receive light from each of said light emitting diodes.

17. The marker lamp according to claim 16 wherein said housing and said lens are made from a substantially identical material.

18. The marker lamp according to claim 16 wherein said material is polycarbonate.

19. The marker lamp according to claim 17 wherein said material is amber.

20. The marker lamp according to claim 17 wherein said material is red.

21. A lamp, comprising:
   a housing adapted to mount to a vehicle;
   a circuit board operatively attached to said housing;
   a lens adapted to be secured to said housing having a center section and two side sections;
   a light source operatively attached to said circuit board; and
   a first and second light refracting element operatively arranged on said lens, wherein said first light refracting element comprises at least one nested picture frame arrangement; and
   a light reflecting element operatively arranged on said lens.

22. The lamp according to claim 21 wherein said first and second light refracting element are operatively arranged on the inside face of said lens in said center section of said lens.

23. The lamp according to claim 21 wherein said light reflecting element is operatively arranged on the inside face of said lens within said two side sections of said lens.

24. The lamp according to claim 21 wherein said second light refracting element comprises a plurality of convex rib optics.

25. The lamp according to claim 21 further comprising a third light refracting element operatively arranged on said lens.

26. The lamp according to claim 25 wherein said third light refracting element comprises a plurality of cylindrical prisms operatively arranged to intersect and form a rectangle that surrounds said first light refracting element.

27. The lamp according to claim 21 wherein said lens is red and said lamp produces a light intensity of 0.25 candelas over a range of 45 degrees up and down in a vertical direction and 45 degrees left and right in a horizontal direction.

28. The lamp according to claim 21 wherein said lens is amber and said lamp produces a light intensity of 0.62 candelas over a range of 45 degrees up and down in a vertical direction and 45 degrees left and right in a horizontal direction.

29. The lamp according to claim 21 that is adapted to mount horizontally or vertically, wherein said lamp satisfies the Society of Automotive Engineers and United Nations standards for marker lamps.

30. The lens according to claim 6 wherein said light reflecting element is located within said two side sections of said lens.

31. The lens according to claim 6 further comprising a third light refracting element, wherein said third light refracting element comprises a plurality of cylindrical prisms operatively arranged to interest and form a rectangle that surrounds said first light refracting element.

* * * * *